United States Patent
Tsuda

(10) Patent No.: US 9,819,775 B2
(45) Date of Patent: Nov. 14, 2017

(54) INFORMATION PROVIDING APPARATUS, INFORMATION PROVIDING METHOD, AND COMMUNICATION SYSTEM

(71) Applicant: SONY CORPORATION, Tokyo (JP)

(72) Inventor: Shinichiro Tsuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 208 days.

(21) Appl. No.: 14/532,385

(22) Filed: Nov. 4, 2014

(65) Prior Publication Data

US 2015/0056966 A1 Feb. 26, 2015

Related U.S. Application Data

(63) Continuation of application No. 13/292,526, filed on Nov. 9, 2011, now Pat. No. 8,897,155.

(30) Foreign Application Priority Data

Nov. 16, 2010 (JP) .................... 2010-256299

(51) Int. Cl.
*H04L 12/28* (2006.01)
*H04M 1/725* (2006.01)
(Continued)

(52) U.S. Cl.
CPC ...... *H04M 1/72519* (2013.01); *H04L 12/145* (2013.01); *H04M 15/8027* (2013.01);
(Continued)

(58) Field of Classification Search
USPC ........................................ 370/252, 329, 386
See application file for complete search history.

(56) References Cited

U.S. PATENT DOCUMENTS

| | | | | |
|---|---|---|---|---|
| 6,416,471 B1* | 7/2002 | Kumar | ............... | G06F 19/323 128/903 |
| 2004/0259545 A1* | 12/2004 | Morita | ............... | G08G 1/005 455/435.1 |

(Continued)

FOREIGN PATENT DOCUMENTS

| | | |
|---|---|---|
| CN | 101815310 A | 8/2010 |
| JP | 2002-077112 A | 3/2002 |

(Continued)

OTHER PUBLICATIONS

Japanese Office Action dated Nov. 18, 2014 in patent application No. 2010-256299.

(Continued)

*Primary Examiner* — John Pezzlo
(74) *Attorney, Agent, or Firm* — Chip Law Group

(57) ABSTRACT

An information providing apparatus includes: a map information storage unit which maintains map information with which at least one of position information, address information, and names of buildings or shops is associated; a communication parameter obtaining unit which obtains communication parameters associated with the position information; an image information creating unit which creates image information in which the communication parameters associated with the position information are described on the map information; and a display unit which displays the image information created by the image information creating unit.

19 Claims, 10 Drawing Sheets

(51) Int. Cl.
*H04L 12/14* (2006.01)
*H04M 15/00* (2006.01)
*H04W 4/02* (2009.01)
*H04W 4/24* (2009.01)
*H04J 1/16* (2006.01)
*H04W 28/16* (2009.01)
*H04W 48/18* (2009.01)

(52) U.S. Cl.
CPC ....... *H04M 15/8033* (2013.01); *H04M 15/85* (2013.01); *H04W 4/02* (2013.01); *H04W 4/24* (2013.01); *H04W 28/16* (2013.01); *H04W 48/18* (2013.01)

(56) References Cited

U.S. PATENT DOCUMENTS

| | | | | |
|---|---|---|---|---|
| 2010/0329320 | A1* | 12/2010 | Umehara | G06N 7/02 375/227 |
| 2013/0165155 | A1* | 6/2013 | Katpelly | H04W 4/185 455/456.3 |

FOREIGN PATENT DOCUMENTS

| | | |
|---|---|---|
| JP | 2003-259416 A | 9/2003 |
| JP | 2004-061704 A | 2/2004 |
| JP | 2004-096267 A | 3/2004 |
| JP | 2004-214875 A | 7/2004 |
| JP | 2007-235492 A | 9/2007 |
| JP | 2007-266777 A | 10/2007 |
| JP | 2008-028877 A | 2/2008 |
| JP | 2008-113455 A | 5/2008 |
| JP | 2009-100391 A | 5/2009 |
| JP | 2009-171388 A | 7/2009 |
| JP | 2009-246843 A | 10/2009 |
| JP | 2010-177945 A | 8/2010 |
| JP | 2012-109742 A | 6/2012 |
| JP | 2012-109742 A | 7/2012 |
| WO | 2007/043108 A1 | 4/2007 |
| WO | 2008/084659 A1 | 7/2008 |

OTHER PUBLICATIONS

Chinese Office Action dated Jul. 1, 2015 in patent application No. 201110353710.9.
Office Action Received for Japanese Patent Application No. 2015-027517 dated Nov. 24, 2015.
Office Action received for Japanese Patent application No. 2015-027517, dated Jun. 28, 2016, 3 pages of office action.
Office Action for JP Patent Application No. 2015-027517, dated Dec. 6, 2016, 4 pages.
Office Action for JP Patent Application No. 2015-027517, dated Jul. 4, 2017, 8 pages of Office Action and 8 pages of English Translation.

* cited by examiner

INFORMATION PROVIDING APPARATUS, INFORMATION PROVIDING METHOD, AND COMMUNICATION SYSTEM

CROSS REFERENCE TO RELATED APPLICATIONS

This application is a continuation of U.S. patent application Ser. No. 13/292,526 filed on Nov. 9, 2011, which claims priority from Japanese Patent Application 2010-256299 filed in the Japan Patent Office on Nov. 16, 2010. Each of the above referenced applications is hereby incorporated by reference in its entirety.

BACKGROUND

The present disclosure relates to an information providing apparatus, an information providing method, and a communication system which provides communication parameters in relation to wireless communication by a wireless communication device such as a mobile phone, a smart phone, or the like for wireless communication via a base station, and particularly to an information providing apparatus, an information providing method, and a communication system which provides communication parameters such as traffic conditions and the like of each base station for a wireless communication device using one or more wireless communication services.

A mobile phone service based on a 3G scheme called third generation has been started in Japan since 2002. At first, the main application of this service was for low-capacity packets for audio, mails, and the like. Thereafter, introduction of HSDPA (High Speed Downlink Access) and the like which enhance the packet communication speed in the downlink direction from a base station to a terminal has promoted the downloading of packets with larger sizes such as downloading of music files, usage (viewing) of video-sharing services such as YouTube (registered trademark), and the like.

In addition, expansion on the wireless network side has also been made with the increase in the downloaded packet capacity, an HSPA+ service which realizes 21 Mbps at a maximum using the 3GPP system and a Mobile WiMAX service which realizes 40 Mbps at a maximum using the IEEE system have also been started. Furthermore, start of an LTE (Long Term Evolution) service which uses OFDMA (Orthogonal Frequency Division Multiple Access) for the downlink in the same manner as in Mobile WiMAX (Worldwide Interoperability for Microwave Access) and a 4G (LTE-Advanced) service have also been scheduled for the second half of 2010 and around 2015, respectively. It has been expected that 1 Gbps at a maximum in a semifixed state and 100 Mbps at a maximum even in a mobile environment may be realized due to the start of such services.

In addition, a high-functionality wireless communication terminal called a "smart phone" mainly for packet communication has further been distributed in tandem with changes such as the increase in use of the download of high-capacity data. In addition, position information has become important information in order for communication business operators and service providers using the Internet to provide more user-oriented services to users in the mobile environment. In such situations, GPS (Global Positioning System) receivers which detect position information are mounted on most smart phones. For example, a wireless communication system which provides information of an estimated position with high precision from a base station to a mobile terminal which does not catch a GPS signal has been suggested (see Japanese Unexamined Patent Application Publication No. 2008-298484, for example). The mobile terminal can operate an application or the like which provides information depending on the current position based on the highly precise position information provided from the base station.

Here, a problem has been occurring in which traffic is locally concentrated and it becomes difficult to obtain sufficient rate due to the concentration of users on a specific base station to download high-capacity packets. It is considered that there is stationary and dynamic local congestion in the base station. It is possible to alleviate stationary local congestion in theory by densely positioning base stations, which is costly. On the other hand, in fact, it is difficult to predict dynamic local congestion, and the dynamic local congestion is managed by providing connection restrictions on the communication business operator side in extreme cases. Therefore, users can know such traffic conditions only through the feeling after the attempt at communication when the communication rate falls sharply, or when a connection is not available at all, for example.

Without checking the traffic conditions of the base station before users start wireless communication via the base station, it is difficult to alleviate the concentration of traffic, and users feel unconformable since connection is not available.

It can be considered that a method will be introduced hereafter in which a connection is not fixed only to one communication business operator but connection with a plurality of communication business operators can also be chosen by managing a SIM (Subscriber Identity Module) of a mobile wireless communication terminal device. Alternatively, the start of various wireless communication services for providing high communication rates has been scheduled, and it is considered that a system for effectively utilizing wireless resources becomes important under such a heterogeneous wireless environment. According to a wireless communication device, it is possible to select which wireless communication service is to be used, based on the maximum communication rate of each wireless communication service or the intensity of received signals.

When traffic is concentrated on a wireless communication service with high maximum communication rate, however, a case is assumed in which the effective communication rate (actual communication rate) of the wireless communication service is lowered while the effective communication rate of another wireless communication service becomes higher. Ultimately, it is considered to be difficult to equalize traffic by choosing connection without users being able to check the traffic conditions of each communication business operator.

SUMMARY

It is desirable to provide an excellent information providing apparatus, an information providing method, and a communication system capable of preferably providing communication parameters in relation to wireless connection by a wireless communication device such as a mobile phone, a smart phone, or the like for wireless communication via a base station.

It is also desirable to provide an excellent information providing apparatus, an information providing method, and a communication system capable of providing communication parameters such as traffic conditions of each base station for a wireless communication device using one or more wireless communication services.

According to a first embodiment of the present disclosure, there is provided an information providing apparatus including: a map information storage unit which maintains map information with which at least one of position information, address information, and names of buildings or shops is associated; a communication parameter obtaining unit which obtains communication parameters associated with the position information; an image information creating unit which creates image information in which the communication parameters associated with the position information are described on the map information; and a display unit which displays the image information created by the image information creating unit.

According to a second embodiment of the present disclosure, the position information handled by the information providing apparatus according to the first embodiment may be position information for a location where a user performs wireless communication. In addition, the communication parameter obtaining unit may obtain communication parameters, which includes levels of congestion of base stations available for the user or communication rate obtained based on the levels of congestion, which are fixed or dynamically changing values.

According to a third embodiment of the present disclosure, the information providing apparatus according to the first embodiment may further include a transmitting unit which transmits the image information created by the image information creating unit to a display apparatus outside the information providing apparatus.

According to a fourth embodiment of the present disclosure, the information providing apparatus according to the first embodiment may further include a communication unit which connects to a predetermined network, wherein the image information created by the image information creating unit may be provided via the network.

According to a fifth embodiment of the present disclosure, the image information creating unit may also describe information relating to a business operator, who manages or operates a base station as a candidate wireless connection destination for the user, on the map information in the information providing apparatus according to the first embodiment.

According to a sixth embodiment of the present disclosure, the image information creating unit may add a link to download information relating to the business operator, who manages or operates the base station as a candidate wireless connection destination for the user, to the map information in the information providing apparatus according to the fifth embodiment.

According to a seventh embodiment of the present disclosure, there is provided a communication system including: an information providing server which includes a map information storage unit which maintains map information with which at least one of position information, address information, and names of buildings or shops is associated, a communication parameter obtaining unit which obtains communication parameters associated with the position information, an image information creating unit which creates image information in which the communication parameters associated with the position information are described on the map information, and a communication unit transmits the image information created by the image information creating unit via the network; and one or more wireless communication terminal devices, each of which includes a receiving unit which receives the image information from the information providing server, a display unit which displays the received image information, and a wireless communication unit which connects to a base station in a wireless manner.

However, the "system" described herein is a logical group of a plurality of apparatuses (or functional modules which realize specific functions) regardless of whether each apparatus or functional module is in a single case.

According to an eighth embodiment of the present disclosure, each of the wireless communication terminal devices may further include a communication parameter detection unit which detects communication parameters and associates the communication parameters with information relating to positions and information relating to time and a transmitting unit which transmits the communication parameters to the information providing server in the communication system according to the seventh embodiment. In addition, the information providing server may further include a communication parameter collecting unit which collects communication parameters received from the plurality of wireless communication terminal devices and an equalizing unit which equalizes the communication parameters in units of the information relating to time and the information relating to positions, and image information in which the equalized communication parameters are described on the map information may be created and provided to the wireless communication terminal devices.

According to a ninth embodiment of the present disclosure, when the wireless communication unit of the wireless communication terminal device is compatible with code division multiple access, the communication parameter detecting unit may detect as communication parameters, receiving levels of pilot signals obtained by performing correlation detection on scramble codes allotted to a plurality of base stations, numerical values calculated based on the pilot signals received from the plurality of base stations, information relating to traffic conditions of each base station, or communication rate, in the communication system according to the eighth embodiment.

According to a tenth embodiment of the present disclosure, when the wireless communication unit of the wireless communication terminal device is compatible with orthogonal frequency division multiple access, the communication parameter detection unit may detect as communication parameters, information relating to the ratio of the number of sub-carriers allotted to a user with respect to the total number of sub-carriers for each frame, which is included in the signals received from a plurality of base stations, information relating to traffic conditions of each base station, or an estimated value of the communication rate based on information relating to the number of sub-carriers allotted to a user with respect to the total number of sub-carriers for each frame, in the communication system according to the eighth embodiment.

According to an eleventh embodiment of the present disclosure, the wireless communication terminal device may further include a communication business operator selecting unit which displays characters or graphics indicating a plurality of communication business operators or wireless schemes on a screen of the display unit and selects a character or a graphic indicating a desired communication business operator or a wireless scheme from among the characters or graphics displayed on the screen, in the communication system according to the seventh embodiment. In such a case, the wireless communication unit may perform setting to the wireless scheme corresponding to the character or a graphic indicating the communication business operator or the wireless scheme selected by the communication business operator selecting unit. In addition, the display unit may apply a visual effect, which is different from that for the characters or the graphics indicating the other communication business operators or the other wireless schemes, to the character or the graphic indicating the communication business operator or the wireless scheme selected by the communication business selecting unit.

According to a twelfth embodiment of the present disclosure, the display unit of the wireless communication terminal device may be divided into a plurality of display regions, and image information in which the communication parameters received from the information providing server or the communication parameters may be displayed on one of the divided display regions, in the communication system according to the seventh embodiment.

According to a thirteenth embodiment of the present disclosure, the information providing server may further include an information size control unit which controls information size when the image information created by the image information creating unit is transmitted from the communication unit, in the communication system according to the seventh embodiment.

According to a fourteenth embodiment of the present disclosure, the information size control unit may control the information size based on the communication parameters corresponding to the current position of the wireless communication terminal device, in the communication system according to the thirteenth embodiment.

According to a fifteenth embodiment of the present disclosure, the information providing server may further include an information creating unit which creates additional information to be sent while being added to the image information created by the image information creating unit, in the communication system according to the thirteenth embodiment. In addition, the information creating unit may create additional information in accordance with the information size determined by the information size control unit.

According to a sixteenth embodiment of the present disclosure, the display unit of the wireless communication terminal device may be divided into a plurality of display regions, the image information in which communication parameters are described and the additional information may be received from the information providing server, the image information in which the communication parameters are described may be displayed on one of the divided display regions, and the additional information may be displayed on another one of the divided display regions, in the communication system according to the fifteenth embodiment.

According to a seventeenth embodiment of the present disclosure, there is provided an information providing method including: maintaining map information with which at least one of position information, address information, and names of buildings or shops is associated; obtaining communication parameters associated with the position information; creating image information in which the communication parameters associated with the position information are described on the map information; and displaying the image information created by an image information creating unit.

According to an eighteenth embodiment of the present disclosure, there is provided a computer program recorded in a computer-readable format, the computer program causing a computer to function as: a map information storage unit which maintains map information with which at least one of position information, address information, and names of buildings or shops is associated; a communication parameter obtaining unit which obtains communication parameters associated with the position information; an image information creating unit which creates image information in which the communication parameters associated with the position information are described on the map information; and a display unit which displays the image information created by the image information creating unit.

The computer program according to the eighteenth embodiment is a computer-readable computer program which realizes predetermined processing on a computer. In other words, it is possible to exhibit cooperative actions on the computer and obtain the same effects as those of the information providing apparatus according to the first embodiment by installing the computer program according to the eighteenth embodiment on the computer.

According to the present disclosure, it is possible to provide an excellent information providing apparatus, an information providing method, and a communication system capable of providing communication parameters such as traffic conditions of each base station for a wireless communication device using one or more wireless communication services.

According to the first to fourth, seventeenth, and eighteenth embodiments of the present disclosure, the user can visually recognize the traffic information before the attempt at wireless communication and not through the sensations after the attempt at wireless communication with their own mobile terminal.

According to the third, fourth, and seventh embodiments of the present disclosure, it is possible to provide information in relation to traffic to a remote user.

According to the fifth and sixth embodiments of the present disclosure, the user can easily obtain information relating to a business operator who manages or operates a base station as a wireless connection destination for a wireless communication terminal device.

According to the eighth to tenth embodiments of the present disclosure, using the information providing server, it is possible to collect the communication parameters detected by a plurality of wireless communication terminal devices, and the information providing server can provide information relating to more reliable traffic to each wireless communication terminal device by equalizing such communication parameters. In addition, according to the ninth and tenth embodiments of the present disclosure, it is possible to detect communication parameters for the network compatible with code division multiple access or orthogonal frequency division multiple access and allow a user to visually recognize the communication parameter before the attempt at wireless connection.

According to the eleventh embodiment of the present disclosure, the user can ascertain the traffic conditions based on the information provided from the information providing server and select a desired wireless connection destination by operating the communication business operator selecting unit.

According to the twelfth embodiment of the present disclosure, it is possible to provide a region, which constantly displays the communication parameters, among the display regions in the display unit of the wireless communication terminal device.

According to the thirteenth to sixteenth embodiments of the present disclosure, the information providing server can minimize the load on the traffic and distribute the additional information since it is possible to adjust the information to have a size in accordance with the traffic conditions at a spot where the wireless communication terminal device is present when the additional information such as an advertisement or the like is distributed along with the information relating to the traffic.

As described above, according to the present disclosure, a communication terminal such as a mobile phone, a smart phone, or the like owned by a user is provided with a unit by which a user can visually check a traffic concentration condition. Accordingly, the user can visually check the traffic conditions of a base station before starting wireless communication via the base station, and it is possible to alleviate traffic concentration. As a result, the user does not feel uncomfortable due to the connection being unavailable.

According to the present disclosure, if a method is introduced in which connections to a plurality of communication business operators can be chosen by managing the SIM of a mobile wireless communication terminal device, or in a heterogeneous wireless environment in which a plurality of wireless communication services are available, the user can connect to a communication business operator with less traffic after visually checking the traffic conditions of each communication business operator. In addition, if each user selects a communication business operator as a connection destination in accordance with the traffic conditions, the traffic is equalized as a result. Accordingly, communication business operators can expect an advantage of reducing unnecessary costs of increasing the number of base stations, and the users can enjoy communication services at low costs as a synergistic effect.

Other purposes, features, advantages of the present disclosure will be clarified in detailed description based on the embodiment of this disclosure which will be described later and accompanying drawings.

DETAILED DESCRIPTION OF EMBODIMENTS

Hereinafter, detailed description will be made of an embodiment of this disclosure with reference to the drawings.

Figure 1:
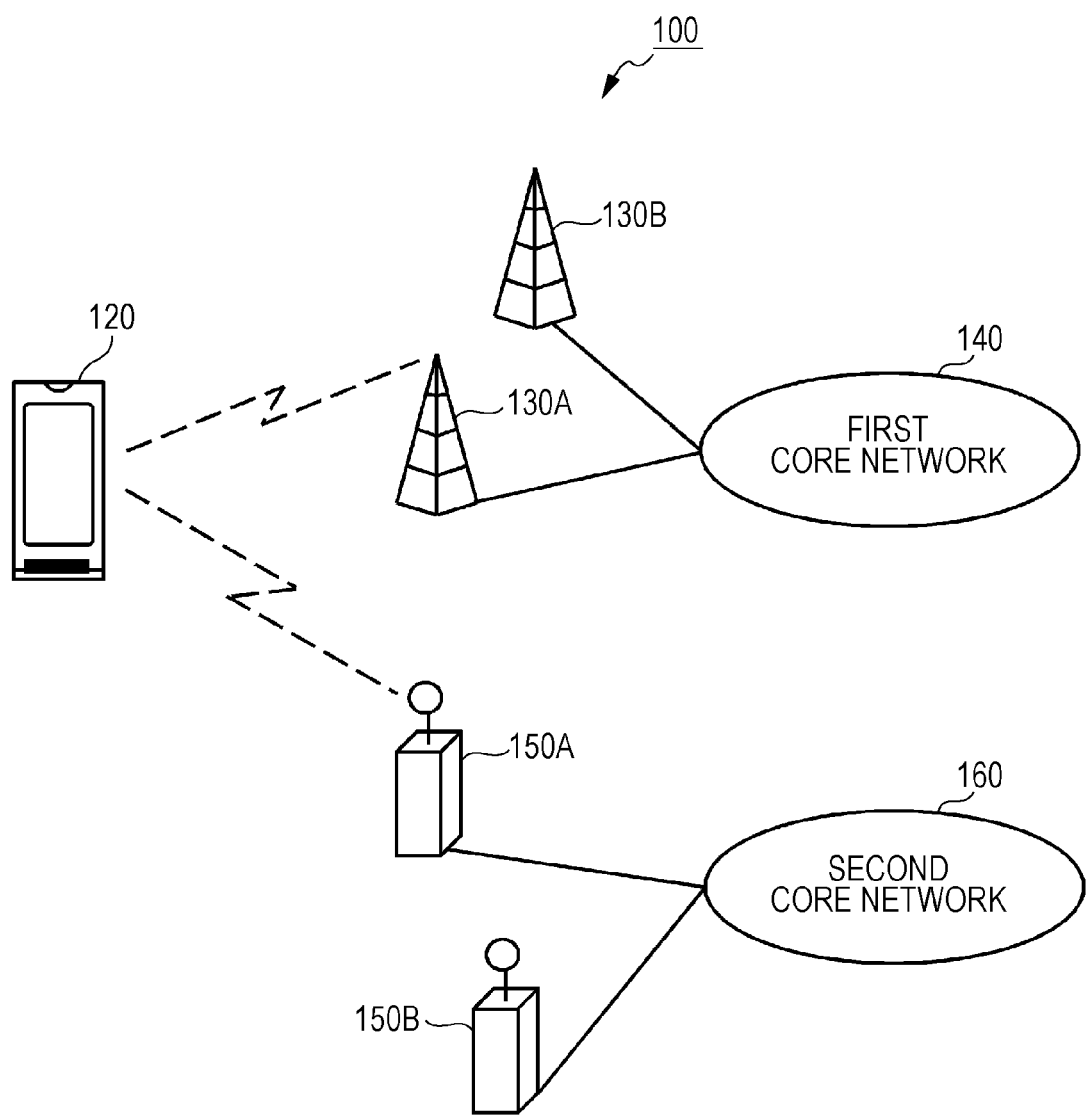
FIG. 1 is a diagram schematically showing a configuration example of a communication system to which the present disclosure is applied.

FIG. 1 schematically shows a configuration example of a communication system to which the present disclosure is applied. According to a communication system 100 in the drawing, a method is introduced in which connection to a plurality of communication business operators can also be chosen by managing a SIM of a mobile wireless communication terminal device, and a heterogeneous wireless environment in which a plurality of wireless communication services are available is assumed.

The communication system 100 in the drawing includes a mobile terminal 120, a plurality of first base stations 130A and 130B, a first core network 140, a plurality of second base stations 150A and 150B, and a second core network 160.

The first core network 140 is the network of a communication business operator which provides a first wireless communication service (a 3G service, for example), and a plurality of first base stations 130 are connected thereto. The first core network 140 includes MME (Mobile Management Entity) for setting and releasing of sessions for data communication, control of handover, and the like, and a gateway which controls the routing, transfer, and the like of user data, for example.

The second core network 160 is the network of a communication business operator which provides a second wireless communication service (LTE, WiMAX, 4G, or the like), and a plurality of second base stations 150 are connected thereto. The second core network 160 includes MME, a gateway, and the like in the same manner as the first core network 140.

The base stations such as the first base station 130, the second base station 150, and the like control communication by a mobile terminal 120. For example, the base station relays data received from the mobile terminal 120 to a destination and transmits the data to the mobile terminal 120 when the data directed to the mobile terminal 120 is received. In addition, the base station can communicate with the mobile terminal 120 by applying a wireless multiple access scheme such as orthogonal frequency-division multiple access (OFDMA), time-division multiple access (TDMA), code division multiple access (CDMA)) or the like.

The mobile terminal 120 can communicate various data items with another apparatus via the first base station 130 or the second base station 150. The various data items include music data such as music, lecture, radio programs, and the like, video data such as movies, television programs, video programs, photographs, documents, web pages, paintings, graphic charts, and the like, games, software, and the like.

Although the mobile terminal 120 is shown in FIG. 1 as an example of the wireless communication device, the wireless communication device is not limited to such an example. For example, the wireless communication device may be an information processing apparatus such as a PC (Personal Computer), a household use video processing apparatus (a DVD recorder, a videocassette recorder, or the like), a PDA (Personal Digital Assistant), a household use game machine, a home electrical appliance, or the like. In addition, the wireless communication device may be an information processing apparatus such as a mobile phone, a PHS (Personal Handyphone System), a mobile music reproducing apparatus, a mobile video processing apparatus, a mobile game machine, or the like.

In addition, as the first base station 130 and the second base station 150, it is possible to assume various base stations such as a macrocell base station, a relay node which relays communication between the macrocell base station and the mobile terminal 120, a femtocell as a household use compact base station, and the like.

The present disclosure provides a unit by which communication parameters such as traffic conditions and the like of each communication business operator are visually checked to a user who moves with a wireless communication device such as a mobile phone or the like, in a communication system as shown in FIG. 1.

Figure 2:
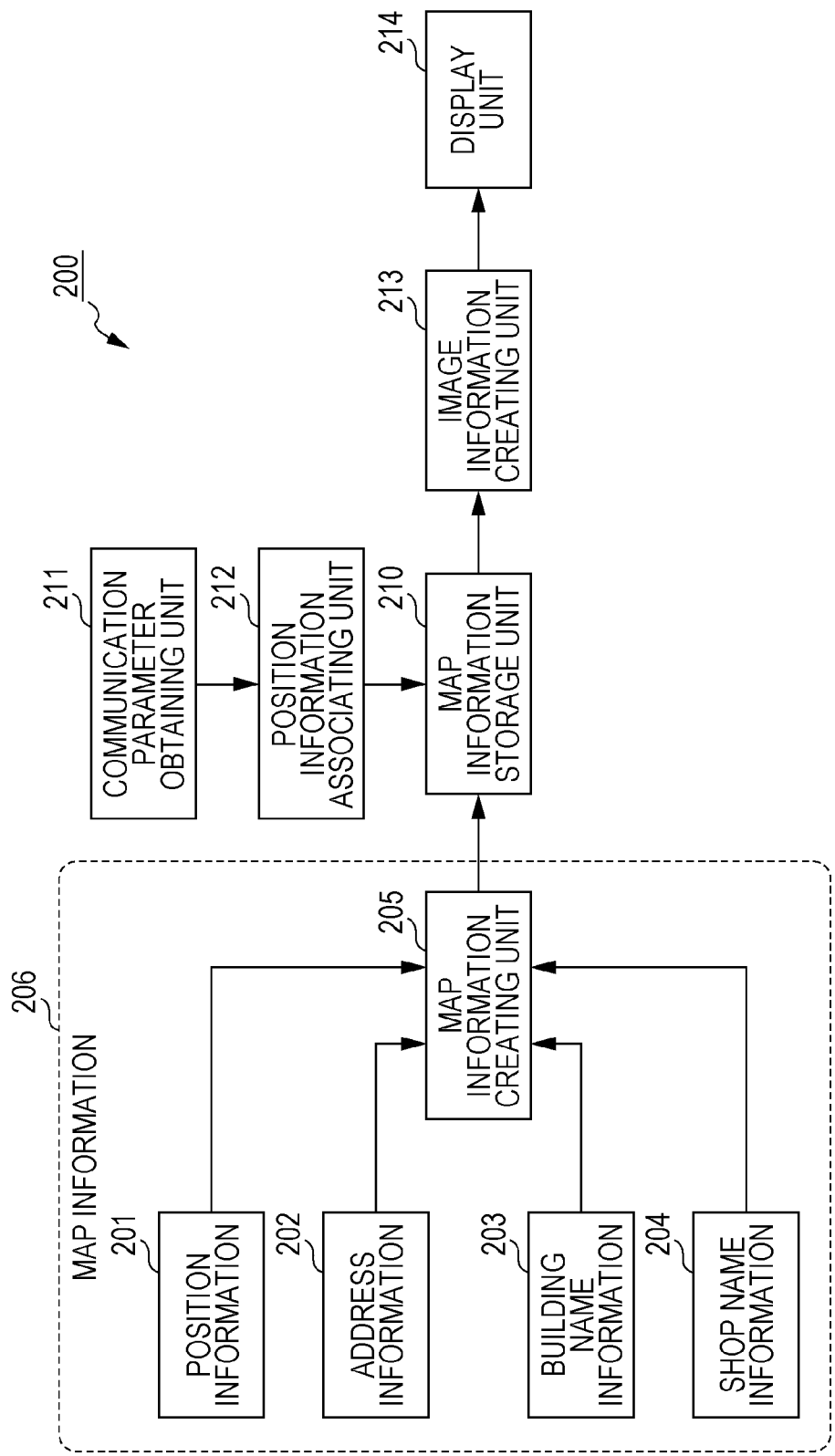
FIG. 2 is a diagram schematically showing a configuration example of an information providing apparatus which provides information for visually checking communication parameters to a user.

FIG. 2 schematically shows a configuration example of an information providing apparatus 200 which provides information for visually checking communication parameters to a user. Hereinafter, description will be made of each component. The information providing apparatus 200 in the drawing has a function of displaying communication parameters on a map including the current position of the user (or the wireless communication device owned by the user).

As shown in the drawing, the information providing apparatus 200 includes a map information storage unit 210, a communication parameter obtaining unit 211, a position information associating unit 212, an image information creating unit 213, and a display unit 214.

The map information 206 stored in the map information storage unit 210 includes position information 201, address information 202, building name information, and shop name information 204, for example. The building name information 203 from among such information 201 to 204 includes names recorded on a general map such as names of rail stations, bus stops of route buses, historic sites, scenic locations, parks, rivers and streams, harbors, and the like, for example.

The position information described herein corresponds to the current position of a location requested to be displayed on the map (the user as an information destination or the wireless communication device owned by the user). Although the map information creating unit 205 creates the map information 206 based on the position information 201, the address information 202, the building name information 203, and the shop name information 204, the scope of the present disclosure is not limited to a specific method of creating map information. The map information creating unit 205 is not necessarily mounted in the information providing apparatus 200. For example, the map information creating unit 205 may be installed outside the information providing apparatus 200 such as a map information creating server constructed on the network and create the map information 206 for displaying corresponding places on the map in response to the request from the information providing apparatus 200 or the like. When the map information 206 created by the map information creating unit 205 is obtained, the information providing apparatus 200 stores the map information 206 in the map information storage unit 210.

The communication parameter obtaining unit 211 obtains parameters in relation to communication associated with the position information 201. The parameters in relation to communication described herein are information relating to levels of congestion of a plurality of public wireless base stations (or base stations of each communication business operator available for users) and communication rate (effective communication rate) calculated from the levels of congestion. However, the parameters in relation to communication are not limited to fixed values but may include parameters which dynamically change in association with time information. Hereinafter, the parameters in relation to communication are simply referred to as "communication parameters". In addition, a method of obtaining the communication parameters by the communication parameter obtaining unit 211 is arbitrary. For example, the core network (as described above) including the base stations can easily ascertain information relating to the communication parameters, and it is possible to configure the communication parameter obtaining unit 211 to obtain the communication parameters from an external apparatus such as the core network or the like. Alternatively, it is also possible to configure the communication parameter obtaining unit 211 to measure or estimate information relating to the levels of congestion and communication rate of base stations and obtain communication parameters based on the result.

The position information associating unit 212 associates the map information stored on the map information storing unit 210 and the communication parameters obtained by the communication parameter obtaining unit 211 with the position information.

The image information creating unit 213 creates the image information in which communication parameters associated with the position information are described on the map information 206. Here, as a method of describing the communication parameters on the map information 206, it is possible to exemplify general methods capable of visually specifying changes such as numerical values, graphs, color changes, and the like. The image information creating unit 213 performs processing of displaying predetermined information on a position on the map information corresponding to the position information of GPS. And the details of such processing have been disclosed in Japanese Unexamined Patent Application Publication No. 2009-193083 which was already transferred to the present applicant.

The image information created by the image information creating unit 213 is transferred to the display unit 214 and displayed on a screen.

Here, the configuration may be made such that the position information associating unit 212 transmits only the change in the communication parameters to the image information creating unit 213, and the image information creating unit 213 creates the image information based on the information corresponding to the change, if there is little change in the map (the movement of the position of the target wireless communication device is small), and only the communication parameters dynamically change. In addition, it is also possible to cause the display unit 214 to display the image information based on the information corresponding to the change in the communication parameters.

In addition, the image information creating unit 213 can also create text information or coded information as well as the image information in which the communication parameters are described on the map information. In such a case, the display unit 214 may be provided with a function of separating the text information or the coded information from the image information.

Figure 3:
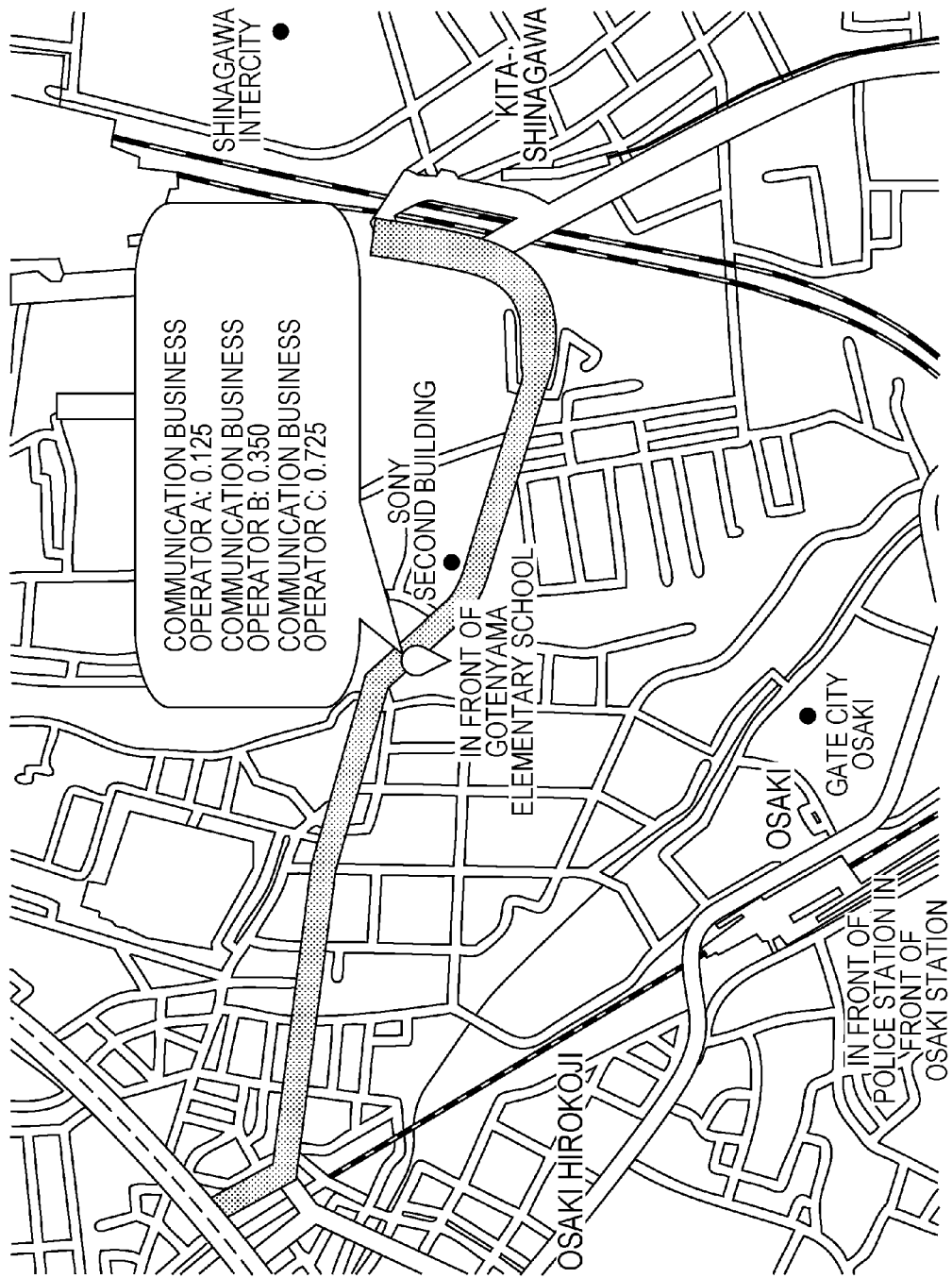
FIG. 3 is a diagram showing an example of image information in which communication parameters (levels of congestion of base stations) are described on map information.

FIG. 3 shows an example of image information, which is created by the image information creating unit 213, in which communication parameters are described on the map information. The image information in the drawing is also a display example of image information by the display unit 214. In the example of the drawing, a numerical value indicating the level of congestion of each base station as one of the communication parameters for each communication business operator is displayed on the map.

Figure 4:
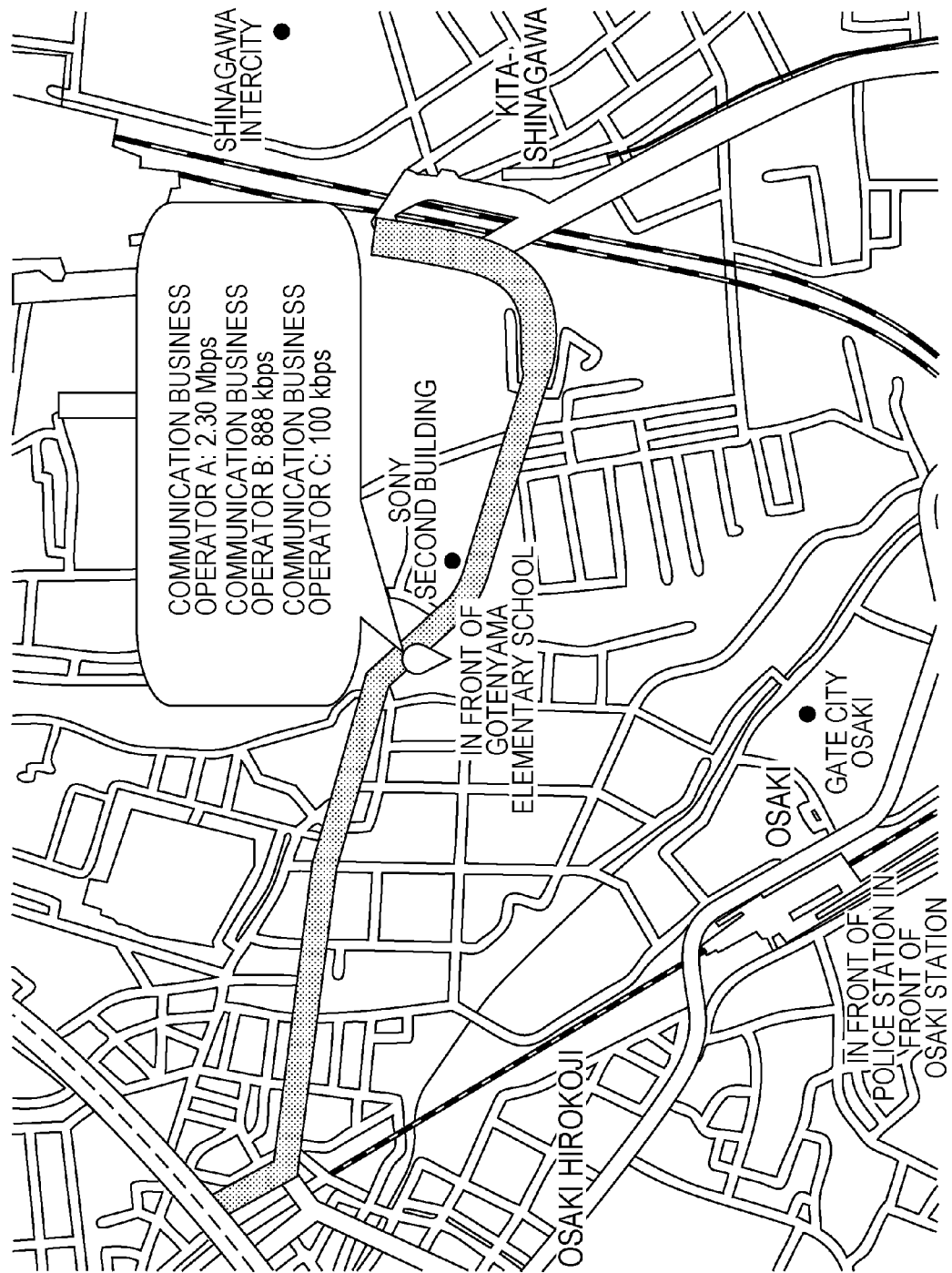
FIG. 4 is a diagram showing another example of image information in which communication parameters (communication rate of base stations) are described on map information.

In addition, FIG. 4 shows another example of image information, which is created by the image information creating unit 213, in which the communication parameters are described on the map information. The image information in the drawing is a display example of the image information by the display unit 214 (in the same manner as above). In the example of the drawing, an estimated value of communication rate (effective communication rate) of each base station as one of the communication parameters of each communication business operator is displayed on the map.

The user can visually check the traffic conditions of the base station as a connection destination by viewing the screen information shown in FIGS. 3 and 4 on the display screen of the display unit 214. For example, when the user visually checks traffic congestion of the base station, the user does not feel uncomfortable by avoiding connection to the base station or selecting a base station of a communication business operator with higher effective communication rate.

In addition, If a method is introduced in which connections to a plurality of communication business operators can be chosen by managing a SIM of a mobile wireless communication terminal device, or in a heterogeneous wireless environment in which a plurality of wireless communication services are available, the user can connect to a communication business operator with less traffic after visually checking the traffic conditions of each communication business operator, according to the present disclosure. In addition, if each user selects a communication business operator as a connection destination in accordance with the traffic condition, the traffic is equalized as a result.

Accordingly, communication business operators can expect an advantage of reducing unnecessary costs for increasing the number of base stations, and the users can enjoy communication services at low costs as a synergistic effect.

Another embodiment can also be considered in which the image information in which communication parameters are described on the map information is created not by a communication apparatus 1, that is, the communication terminal owned by the user but by an information providing apparatus of a server or the like and provided to a remote display apparatus (the communication apparatus 1 owned by the user) via the network.

Figure 5:
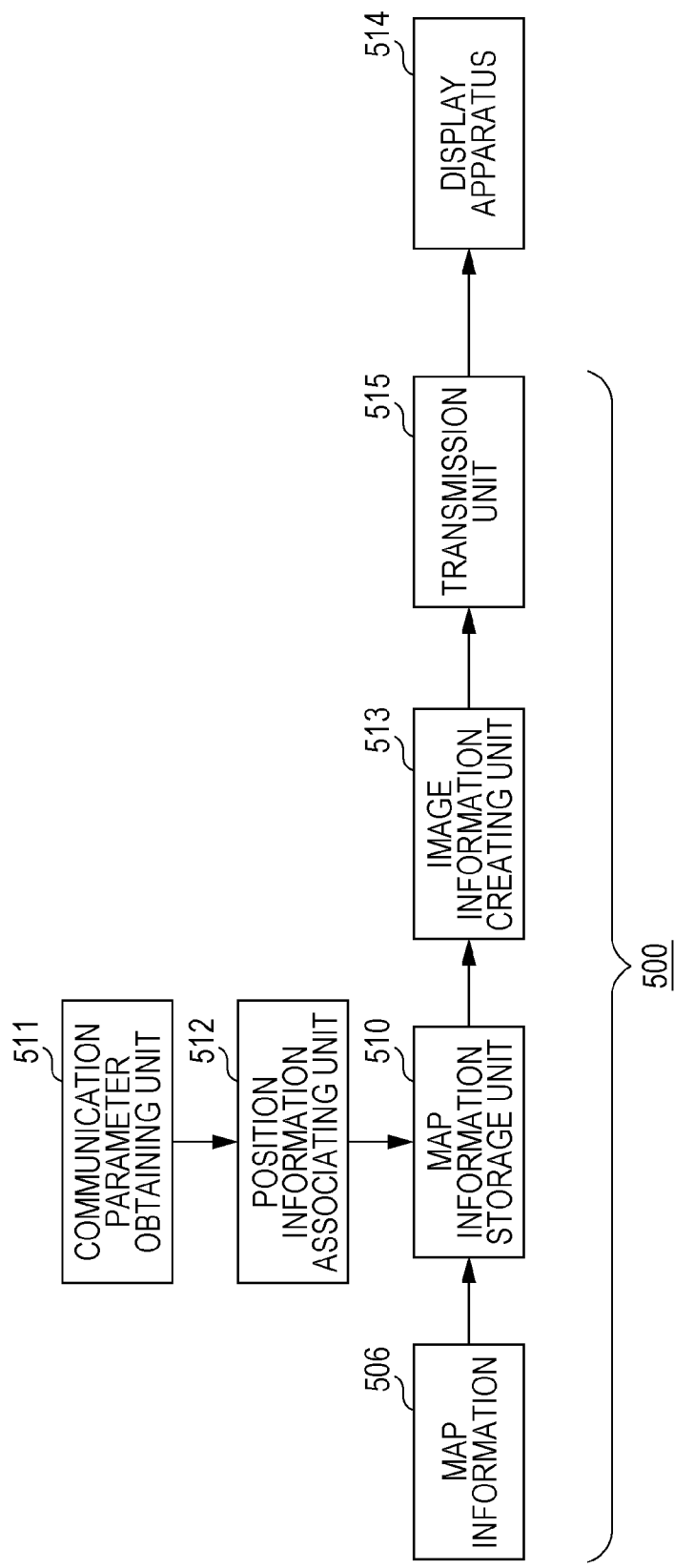
FIG. 5 is a diagram showing a configuration example of an information providing apparatus which provides information for visually checking communication parameters to a user.

FIG. 5 shows a configuration example of an information providing apparatus 500 which provides information for visually checking communication parameters to a user. Unlike FIG. 2, the information providing apparatus 500 is configured to transmit image information in which communication parameters are described on the map information to a remote display apparatus 514.

The information providing apparatus 500 in the drawing includes a map information storage unit 510 storing map information 506, a communication parameter obtaining unit 511, a position information associating unit 512, an image information creating unit 513, and a transmitting unit 515.

The map information 506 stored in the map information storage unit 510 includes position information, address information, building name information, shop name information, for example. Among them, the building name information includes names recorded on a general map such as names of rail stations, bus stops of route buses, historic sites, scenic locations, parks, rivers and streams, harbors, and the like, for example (as described above). The position information described herein corresponds to the current position of a location for which map display is requested (a user as an information providing target (or a wireless communication device owned by the user), for example).

The communication parameter obtaining unit 511 obtains communication parameters associated with the position information. The communication parameters described herein are information relating to levels of congestion of a plurality of public wireless base stations (or base stations of each communication business operator available for the user) and communication rate calculated based on the levels of congestion (as described above). However, the communication parameters are not limited to fixed values but may include parameters which dynamically vary in association with the time information.

The position information associating unit 512 associates the map information 506 stored in the map information storage unit 510 and the communication parameters obtained by the communication parameter obtaining unit 511 with the position information (as described above).

The image information creating unit 513 creates image information in which the communication parameters associated with the position information are described on the map information 506. The image information created by the image information creating unit 513 is the same as those shown in FIGS. 3 and 4.

The transmitting unit 515 is provided with a wired or wireless communication unit, and the information providing apparatus 500 is connected to the display apparatus 514 via the transmitting unit 515. The display apparatus 514 is a personal computer connected via the Internet, for example. Even if the display apparatus 514 is geographically far from the installation position of the information providing apparatus 4, it is possible to transfer the image information created by the image information creating unit 513 from the transmitting unit 515 and display the image information on the screen of the display apparatus 514.

The display apparatus 514 may be digital signage installed in carriages of public transportation, vehicles, commercial vehicles, walls of buildings, station yards, public facilities, and the like. The information providing apparatus 500 can display image information for displaying communication parameters on the map via a wired or wireless communication tool.

The user can select a communication business operator as a connection destination by visually checking the traffic conditions of each communication business operator from the display screen of the display apparatus 514 when the user starts the wireless connection of the mobile terminal of its own. As a result, the traffic is equalized, and therefore, the communication business operators can expect an advantage of reducing unnecessary costs for increasing the number of base stations, and the users can enjoy communication services at low costs as a synergistic effect.

Figure 6:
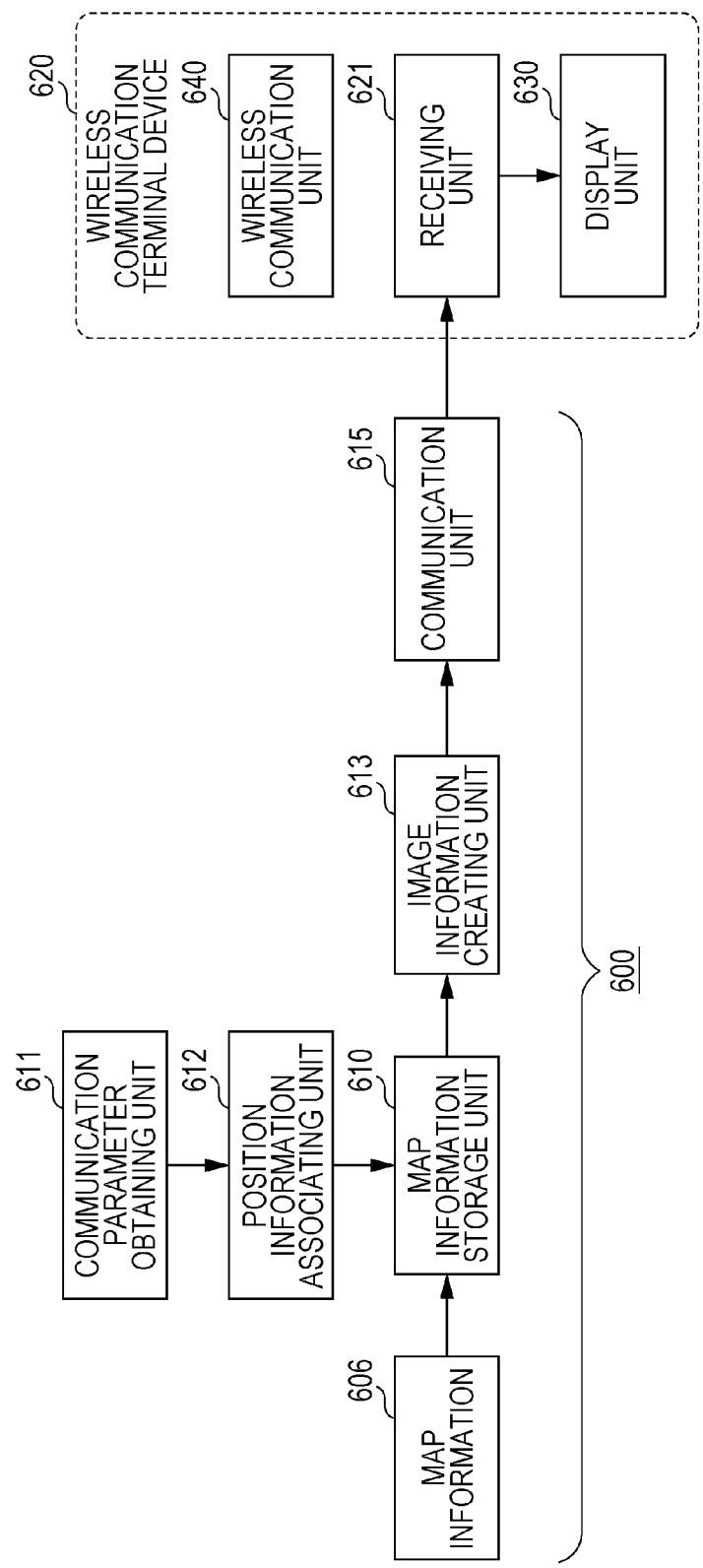
FIG. 6 is a diagram showing a configuration example of a communication system including an information providing apparatus which provides information for visually checking communication parameters to a user and a wireless communication terminal device using provided information.

FIG. 6 shows a configuration example of a communication system including an information providing apparatus 600 which provides information for visually checking communication parameters to a user and a wireless communication terminal device 620 using the provided information.

The information providing apparatus 600 in the drawing includes a map information storage unit 610 storing the map information 606, a communication parameter obtaining unit 611, a position information associating unit 612, an image information creating unit 613, and a communication unit 615.

On the other hand the wireless communication terminal device 620 includes a receiving unit 621, a display unit 630, and a wireless communication unit 640. The wireless communication terminal device 620 is a communication terminal such as a mobile phone, a smart phone, or the like, for example, owned by the user. Although the wireless communication terminal device 620 includes functional blocks other than those shown in the drawing, the description thereof will be omitted here.

The map information 606 stored in the map information storage unit 610 includes position information, address information, building name information, and shop name information, for example. Among them, the building name information includes names recorded on a general map such as names of rail stations, bus stops of route buses, historic sites, scenic locations, parks, rivers and streams, harbors, and the like, for example (as described above). The position information described herein corresponds to the current position of a location requested to be displayed on the map (the user as an information destination or the wireless communication device owned by the user).

The communication parameter obtaining unit 611 obtains communication parameters associated with the position information. The communication parameters described herein is information relating to levels of congestion of a plurality of public wireless base stations (or base stations of each communication business operator available for the user) and communication rate calculated based on the levels of congestion (as described above). However, the communication parameters are not limited to fixed values but may include parameters which dynamically vary in association with the time information.

The position information associating unit 612 associates the map information 606 stored in the map information storage unit 610 and the communication parameters obtained by the communication parameter obtaining unit 611 with the position information (as described above).

The image information creating unit 613 creates image information in which the communication parameters associated with the position information are described on the map information 606. The image information created by the image information creating unit 613 is the same as those shown in FIGS. 3 and 4.

Here, when the communication rate of all base stations of communication business operators available from the current position of the wireless communication terminal device 620 as the providing target of the image information is less than a predetermined threshold value, the image information creating unit 613 may further describe image information indicating the names and positions of communication business operators of the base stations (candidate base stations), which are providing relatively high communication rate around the position, on the map information 606. In addition, when such candidate base stations are access points or femtocells managed or operated by a shop, the image information creating unit 613 may also describe the name of the shop on the map information 606. Moreover, the image information creating unit 613 may add a necessary link, with which it is possible to download information relating such a shop through a simple operation, to the map information.

The communication unit 615 is provided with a communication unit which connects to a predetermined network for communication. The information providing apparatus 600 can communicate with the wireless communication terminal device 620 via the network from the communication unit 615. When the receiving unit 621 obtains image information from the information providing apparatus 600, the wireless communication terminal device 620 can display the information on the screen of the display unit 630.

If a method is introduced in which connections to a plurality of communication business operators can be chosen by managing a SIM of a mobile wireless communication terminal device, or in a heterogeneous wireless environment in which a plurality of wireless communication services are available, the user of the wireless communication terminal device 620 can select a communication business operator as a connection destination of the wireless communication unit 640 by visually checking the traffic conditions of each communication business operator from the map information displayed on the screen of the display apparatus 630 (see FIGS. 3 and 4). Since the traffic is equalized as a result, the communication business operators can expect an advantage of reducing unnecessary costs for increasing the number of base stations. In addition, the users can enjoy communication services at low costs as a synergistic effect.

It is also possible to constantly display image information in which the communication parameters are described on the map when an arbitrary application is activated on the wireless communication terminal device 620, and it is also possible dynamically change the image information. When the shop information is also recorded in the map information, and a link to the shop information is added, the user can download the shop information with a simple operation via the display screen.

Figure 7:
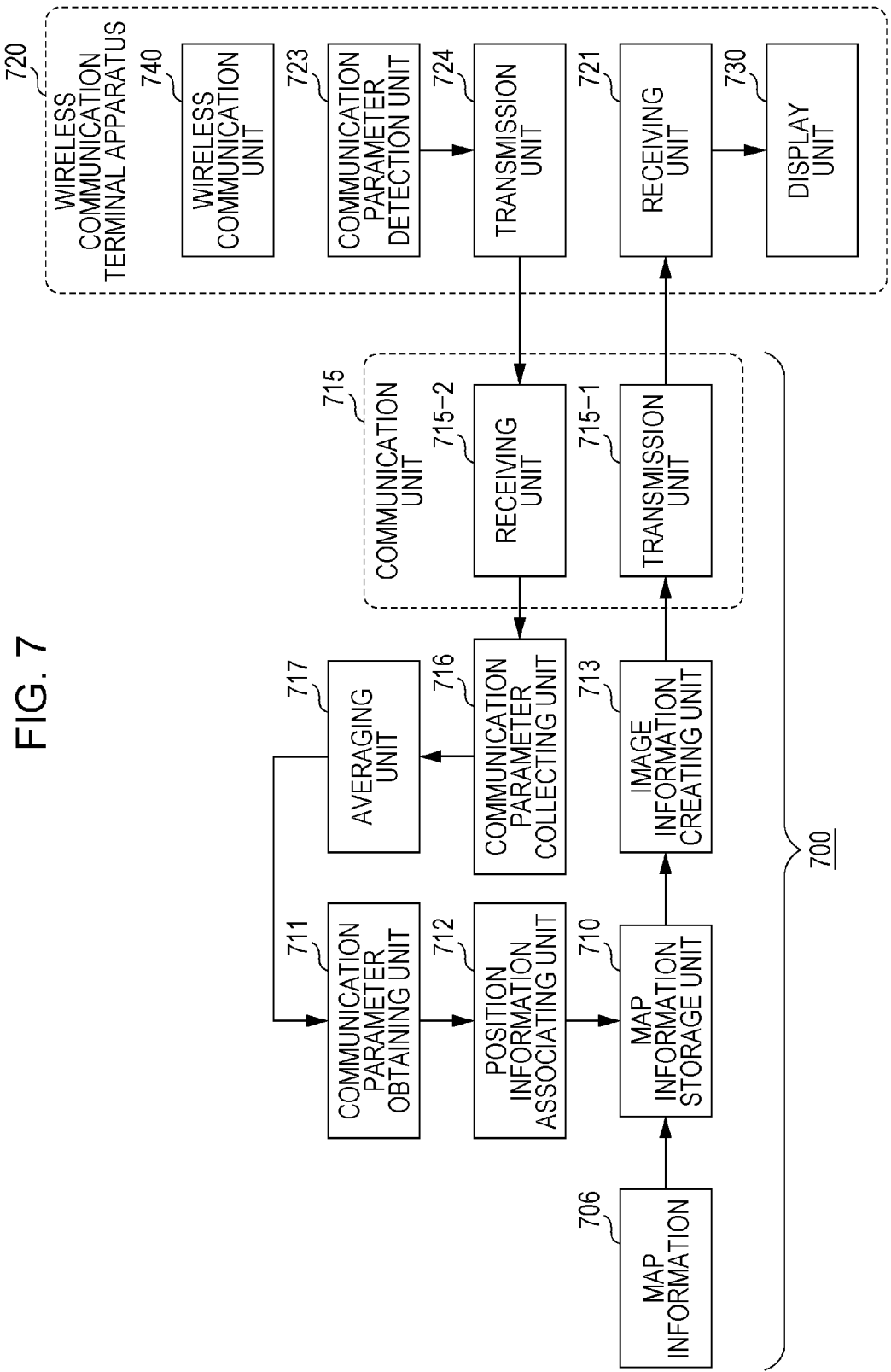
FIG. 7 is a diagram showing another configuration example of a communication system including an information providing apparatus which provides information for visually checking communication parameters to a user and a wireless communication terminal device using provided information.

FIG. 7 shows another configuration example of a communication system including an information providing apparatus 700 which provides information for visually checking the communication parameters to the user and a wireless communication terminal device 720 using the provided information. The communication system is different from that shown in FIG. 6 mainly in that the wireless communication terminal device 720 is provided with a communication parameter detection unit 723 and that the information providing apparatus 700 collects the communication parameter from the wireless communication terminal device 720.

The wireless communication terminal device 720 is a communication terminal such as a mobile phone, a smart phone, or the like owned by the user and includes a communication parameter detection unit 723, a transmitting unit 724, and a wireless communication unit 740 in addition to a receiving unit 721 and a display unit 730. Although the wireless communication terminal device 720 includes functional blocks other than those in the drawing, the description thereof will be omitted here.

The communication parameters detected by the communication parameter detection unit 722 are associated at least with the information relating to positions and the information relating to time. For example, in Japanese Patent Application No. 2010-142384 which was already transferred to the present applicant, a method in which a wireless communication device obtains communication parameters has been disclosed. Hereinafter, the communication parameters detected by the communication parameter detection unit 722 will be exemplified.

(1) receiving levels of pilot signals obtained by performing correlation detection on scramble codes allotted to one or a plurality of base stations compatible with code division multiple access, or numerical values or communication rate calculated based on the pilot signal received from a plurality of base stations.

(2) the information relating to the ratio of the number of sub-carriers allotted to the user with respect to the total number of sub-carriers for each frame, which is included in the signals received from one or a plurality of base stations compatible with orthogonal frequency division multiple access, information relating to the traffic conditions of each base station, or estimated values of communication rate calculated based on information relating to the ratio of the number of sub-carriers allotted to the user with respect to the total number of sub-carriers for each frame.

Then, the wireless communication terminal device 720 associates the communication parameters detected by the communication parameter detection unit 722 with the information relating to positions and the information relating to the time, and the communication parameters are then transmitted to the information providing apparatus 700 as a server via the transmitting unit 723.

The information providing apparatus 700 further includes a communication parameter collecting unit 716 and an equalizing unit 717 as well as the map information storage unit 710, the communication parameter obtaining unit 711, a position information associating unit 712, an image information creating unit 713, and a communication unit 715.

The information providing apparatus 700 causes a receiving unit 715-2 in the communication unit 715 to receive the communication parameters sent from one or a plurality of wireless communication terminal devices 720 and causes a communication parameter collecting unit 716 to collect the communication parameters.

The equalizing unit 717 equalizes the communication parameters collected by the communication parameter collecting unit 716 for each arbitrary resolution of the information relating to positions. That is, the equalizing unit 717 equalizes a plurality of communication parameters which can be approximated with the communication parameters detected at a geographically adjacent position over the parameters thereof at each time point which can be approximated with a certain time point. The equalizing unit 717 can also perform computations of calculating dispersion and excluding samples with extremely wide dispersion with such equalizing. The equalized value of the communication parameters associated with the position information with a limited resolution, which is obtained by the equalizing unit 717, can be referred to from the communication parameter obtaining unit 711.

The position information associating unit 712 associates the map information 706 stored in the map information storage unit 710 and the equalized value of communication parameters referred to from the communication parameter obtaining unit 711 with the position information. The image information creating unit 713 creates the image information in which the equalized value of the communication parameters associated with the position information is described on the map information. The image information created by the image information creating unit 713 is the same as those shown in FIGS. 3 and 4. Then, the information providing apparatus 700 transmits the image information created by the image information creating unit 713 to the wireless communication terminal device 720 via the transmitting unit 715-1 in the communication unit 715.

When the receiving unit 721 receives the image information created by the image information creating unit 713 from the information providing apparatus 700, the wireless communication terminal device 720 can display the image information on the screen of the display unit 730. If a method is introduced in which connections to a plurality of communication business operators can be chosen by managing a SIM of a mobile wireless communication terminal device, or in a heterogeneous wireless environment in which a plurality of wireless communication services are available, the user of the wireless communication terminal device 720 can select a communication business operator as a connection destination by visually checking the traffic conditions of each communication business operator from the map information displayed on the screen of the display unit 730 (see FIGS. 3 and 4). Since the traffic is equalized as a result, the communication business operators can expect an advantage of reducing unnecessary costs for increasing the number of base stations. In addition, the users can enjoy communication services at low costs as a synergistic effect.

Figure 8:
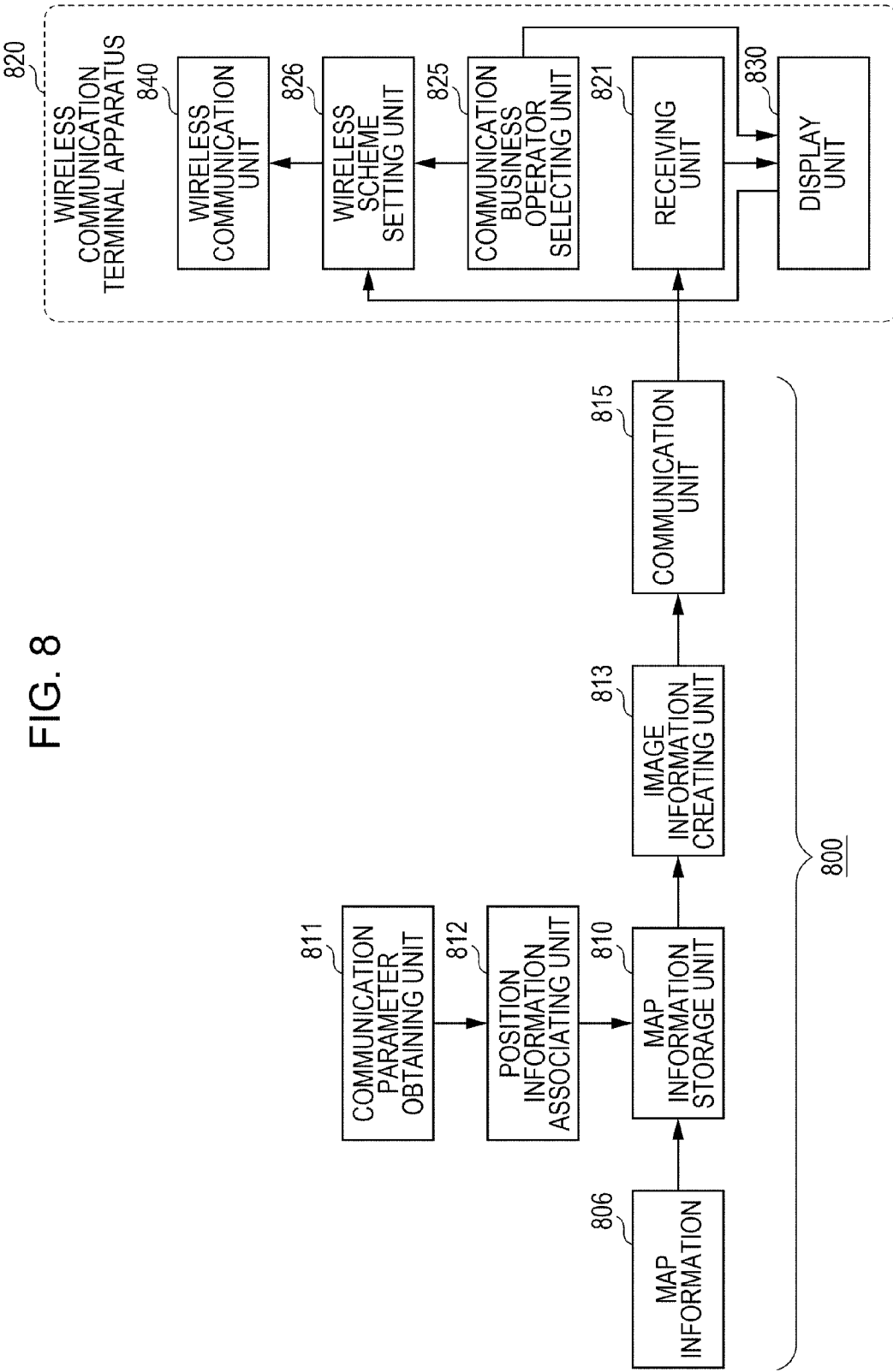
FIG. 8 is a diagram showing another configuration example of a communication system including an information providing apparatus which provides information for visually checking communication parameters to a user and a wireless communication terminal device using provided information.

FIG. 8 shows another configuration example of a communication system including an information providing apparatus 800 which provides information for visually checking the communication parameter to the user and a wireless communication terminal device 820 using the provided information. The communication system is different from that shown in FIG. 6 mainly in that a different character or an icon corresponding to a desired communication business operator or a character or an icon corresponding to a wireless scheme such as a carrier frequency or the like is selected from among graphics such as characters, icons, and the like indicating communication business operators or graphics such as characters or an icon corresponding to wireless schemes such as a carrier frequencies or the like displayed on the screen of the display unit 830, to each of which different visual effects are given. The user can execute a telephone call or packet communication after setting the selected wireless scheme. Furthermore, the map information displayed on the screen of the display unit 830 (see FIG. 3 or 4) or coded map information can automatically select a communication business operator as a connection destination of the wireless communication unit 840 in accordance with the user preference. In addition, the user can also make the setting relating to the user preference in order to automatically perform the selection.

The information providing apparatus 800 in the drawing includes a map information storage unit 810 storing the map information 806, a communication parameter obtaining unit 811, a position information associating unit 812, an image information creating unit 813, and a communication unit 815.

On the other hand, the wireless communication terminal device 820 includes a receiving unit 821, a display unit 830, a communication business operator selecting unit 825, a wireless scheme setting unit 826, and a wireless communication unit 840. The wireless communication terminal device 820 is a communication terminal such as a mobile phone, a smart phone, or the like owned by a user. Although the wireless communication terminal device 820 includes functional blocks other than those shown in the drawing, the description thereof will be omitted here.

The map information 806 stored in the map information storage unit 810 includes position information, address information, building name information, shop name information, for example. Among them, the building name information includes names recorded on a general map such as names of rail stations, bus stops of route buses, historic sites, scenic locations, parks, rivers and streams, harbors, and the like, for example (as described above). The position information described herein corresponds to the current position of a location for which map display is requested (a user as an information providing target (or a wireless communication device owned by the user), for example).

The communication parameter obtaining unit 811 obtains communication parameters associated with the position information. The communication parameters described herein are information relating to levels of congestion of a plurality of public wireless base stations (or base stations of each communication business operator available for the user) and communication rate calculated based on the levels of congestion (as described above). The communication parameters may be a communication parameter obtained by equalizing the collected communication parameters collected from a plurality of wireless communication devices in units of information relating to time and information relating to positions. However, the communication parameters are not limited to fixed values but may include parameters which dynamically vary in association with the time information.

The position information associating unit 812 associates the map information stored in the map information storage unit 810 and the communication parameters obtained by the communication parameter obtaining unit 811 with the position information (as described above).

The image information creating unit 813 creates the image information in which the communication parameters associated with the position information are described on the map information 806. The image information created by the image information creating unit 813 is the same as those shown in FIGS. 3 and 4.

The communication unit 815 is provided with a communication unit which connects to a predetermined network for communication. The information providing apparatus 800 can communicate with the wireless communication terminal device 820 via the network from the communication unit 815. When the receiving unit 821 obtains the image information from the information providing apparatus 800, the wireless communication terminal device 820 displays the information on the screen of the display unit 830. On the screen of the display unit 830, graphics such as characters, icons, and the like indicating the communication business operators and graphics such as characters, icons, and the like corresponding to the wireless schemes such as carrier frequencies or the like are displayed.

The user of the wireless communication terminal device 820 can select a character or an icon corresponding to a desired communication business operator or a character or an icon corresponding to a wireless scheme such as a carrier frequency or the like from among the graphics such as characters or icons indicating the communication business operators or the graphics such as characters or icons corresponding to the wireless schemes such as carrier frequencies, which are displayed on the screen of the display unit 830, by operating the communication business operator selecting unit 825.

In addition, the display unit 830 may be configured to apply a visual effect to a graphic such as a character, an icon, or the like indicating the selected communication business operator or a graphic such as a character, an icon, or the like corresponding to the wireless scheme such as a carrier frequency or the like, which is different from that for other graphics such as characters, icons, or the like indicating other unselected communication business operator or other graphics such as characters, icons, or the like corresponding to the wireless schemes such as carrier frequencies or the like, in response to the result of the user selection via the communication business operator selecting unit 825. Here, the different visual effect is realized by changing the color of the character on the display unit 830, causing the character to blink, changing the background color of the character, or causing the background color of the character to blink, by a click operation or the like by the user.

In addition, the output from the communication business operator selecting unit 825 is transmitted to the wireless scheme setting unit 826. The wireless scheme setting unit 826 performs on the wireless communication unit 840 the setting to the wireless scheme corresponding to the graphic such as a character, an icon, or the like corresponding to one communication business operator, to which a visual effect different from that for the other graphics such as characters, icons, or the like corresponding to the other communication business operators or the other graphics such as characters, icons, or the like corresponding to the wireless schemes such as carrier frequencies, which has not been selected on the display unit 830, is applied. If telephone call or packet communication is started in this state, the wireless communication unit 840 executes telephone call or packet communication via the communication business operator or based on the scheme corresponding to the wireless scheme such as a carrier frequency, which is selected by the communication business operator selecting unit 825.

If a method is introduced in which connections to a plurality of communication business operators can be chosen by managing a SIM of a mobile wireless communication terminal device, or in a heterogeneous wireless environment in which a plurality of wireless communication services are available, the user of the wireless communication terminal device 820 can select a communication business operator as a connection destination by visually checking the traffic conditions of each communication business operator from the map information displayed on the screen of the display unit 830 (see FIG. 3 or 4) and operating the communication business operator selecting unit 825. Since the traffic is equalized as a result, the communication business operators can expect an advantage of reducing unnecessary costs for increasing the number of base stations. In addition, the users can enjoy communication services at low costs as a synergistic effect.

A selecting method by the communication business operator selecting unit 825 is not limited to a click operation on the display screen of the display unit 830 by the user. For example, a method is also applicable in which a communication business operator or a wireless scheme is selected based on the setting file in which user preference is preset. Specifically, when the user performs setting such that communication at low communication costs is to be selected with priority, a communication business operator providing communication at the lowest costs or a wireless scheme at the lowest costs is automatically selected among the information displayed on the display unit 830. Alternatively, when the user made setting such that communication at the highest communication rate is to be selected with priority, a communication business operator providing communication at the highest communication rate or a wireless scheme at the highest communication rate is automatically selected in the information displayed on the display unit 830.

Figure 9:
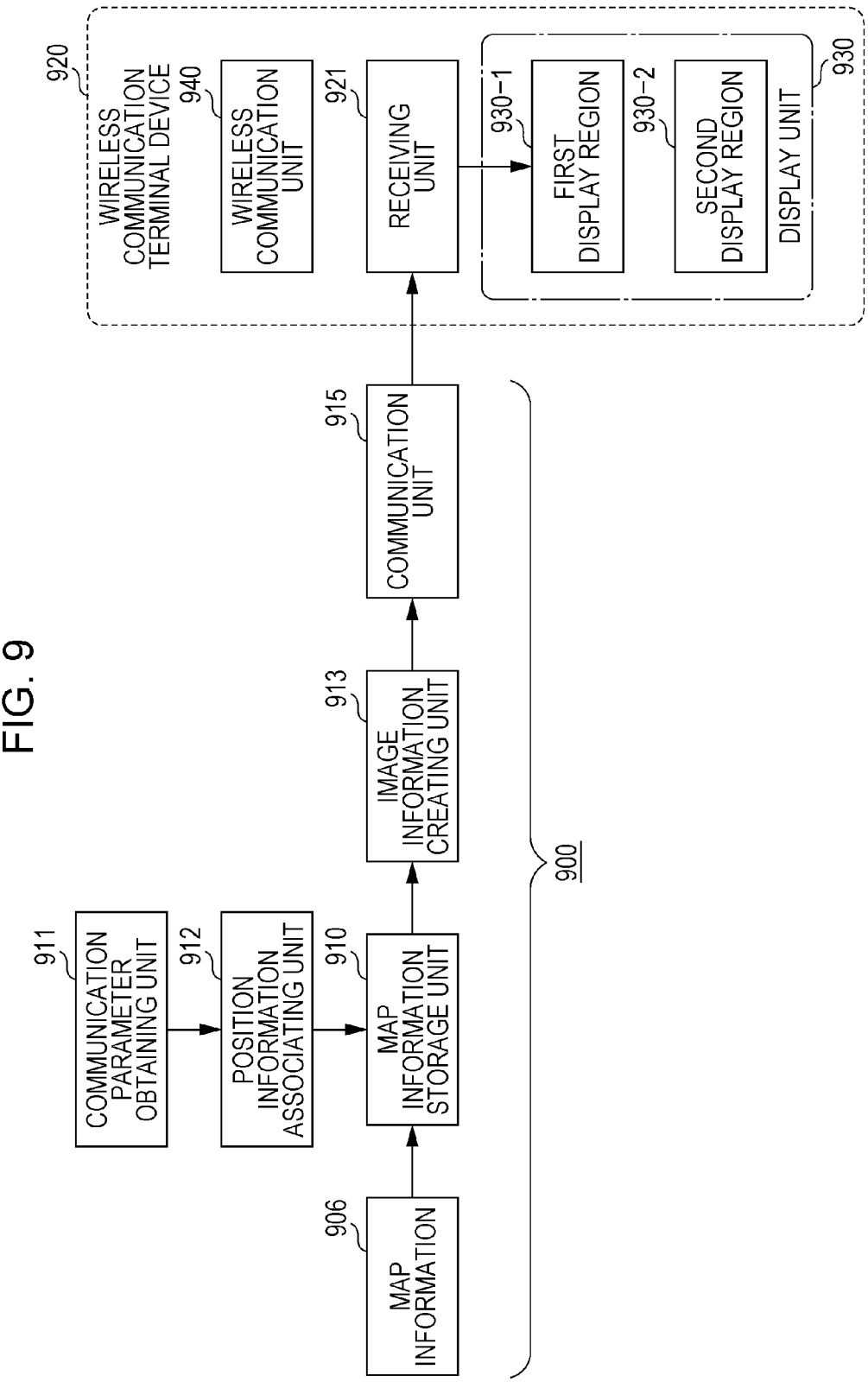
FIG. 9 is a diagram showing still another configuration example of a communication system including an information providing apparatus which provides information for visually checking communication parameters to a user and a wireless communication terminal device using provided information.

FIG. 9 shows still another configuration example of a communication system including an information providing apparatus 900 which provides information for visually checking the communication parameters to a user and a wireless communication terminal device 920 using the provided information.

The information providing apparatus 900 includes a map information storage unit 910 storing the map information 906, a communication parameter obtaining unit 911, a position information associating unit 912, and an image information creating unit 913, a communication unit 915, and functions as a server which provides image information to the wireless communication terminal device 920, for example.

On the other hand, the wireless communication terminal device 920 is provided with a receiving unit 921 and a display unit 930. The wireless communication terminal device 920 is a communication terminal such as a mobile phone, a smart phone, or the like owned by a user. The communication system is different from that shown in FIG. 6 mainly in that the display unit 930 includes a plurality of display regions including a first display region 930-1 and a second display region 930-2.

The map information 906 stored in the map information storage unit 910 includes position information, address information, building name information, shop name information, for example. Among them, the building name information includes names recorded on a general map such as names of rail stations, bus stops of route buses, historic sites, scenic locations, parks, rivers and streams, harbors, and the like, for example (as described above). The position information described herein corresponds to the current position of a location for which map display is requested (a user as an information providing target (or a wireless communication device owned by the user), for example).

The communication parameter obtaining unit 911 obtains communication parameters associated with the position information. The communication parameters described herein are information relating to levels of congestion of a plurality of public wireless base stations and communication rate calculated based on the levels of congestion (as described above). The communication parameters may be a communication parameter obtained by equalizing the collected communication parameters collected from a plurality of wireless communication devices in units of information relating to time and information relating to positions. However, the communication parameters are not limited to fixed values but may include parameters which dynamically vary in association with the time information.

The position information associating unit 912 associates the map information 906 stored in the map information storage unit 910 and the communication parameters obtained by the communication parameter obtaining unit 911 with the position information (as described above).

The image information creating unit 913 creates image information in which the communication parameters associated with the position information are described on the map information. The communication unit 915 is provided with a wireless communication tool, and the information providing apparatus 900 transmits the image information to the wireless communication terminal device 920 via the communication unit 915. The wireless communication terminal device 920 obtains the image information via the receiving unit 921. The obtained image information is sent to the display unit 930 and displayed on the first display region 930-1 which is one of a plurality of display regions. It is possible to constantly use the first display region 930-1 as a region which displays the communication parameters.

If a method is introduced in which connections to a plurality of communication business operators can be chosen by managing the SIM of a mobile wireless communication terminal device, or in a heterogeneous wireless environment in which a plurality of wireless communication services are available, the user of the wireless communication terminal device 920 can select a communication business operator as a connection destination of the wireless communication unit 940 by visually checking the traffic conditions of each communication business operator from the communication parameters displayed on the first display region 930-1 of the display unit 930. Since the traffic is equalized as a result, the communication business operators can expect an advantage of reducing unnecessary costs for increasing the number of base stations. In addition, the users can enjoy communication services at low costs as a synergistic effect.

In addition, the image information creating unit 913 can transmit only numerical values of communication parameters without the map information. In such a case, numerical values of the communication parameters for one or a plurality of public wireless base stations are displayed on the first display region 930-1. As the methods of displaying the numerical values, it is possible to display the numerical values in a graph form or in a digital format such as a meter, or the like, or display the numerical values with icons which reminds the user of the levels of congestion or icons which reminds the user of the communication speed.

In addition, it is matter of course that the wireless communication terminal device 920 is provided with a plurality of display units and one of them is caused to display the image information created by the image information creating unit 913, as well as the method of dividing the display region of the display unit 930 into a plurality of regions.

Figure 10:
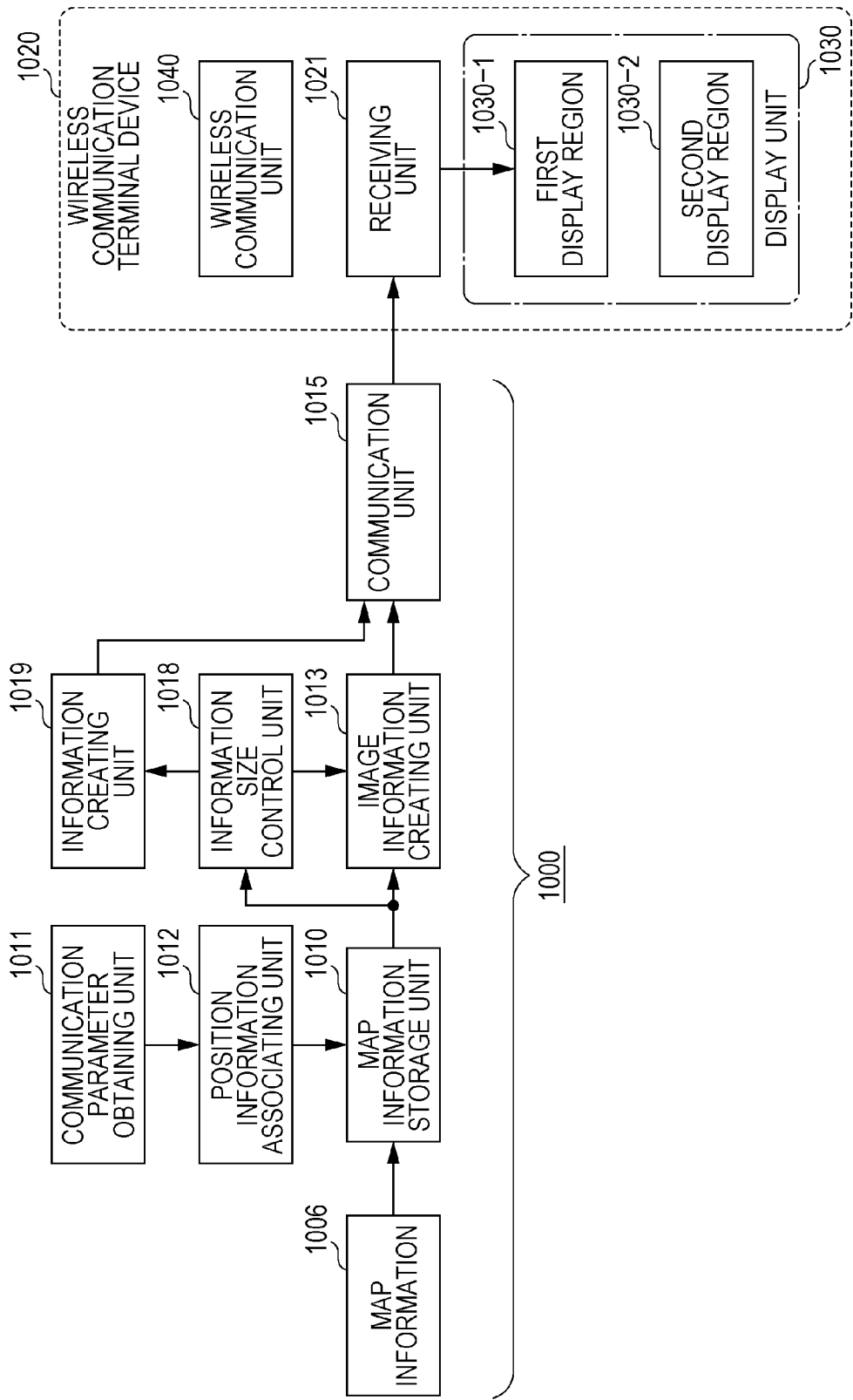
FIG. 10 is a diagram showing a modified example of a communication system shown in FIG. 9.

FIG. 10 shows a modified example of the communication system shown in FIG. 9. The communication system is different from that shown in FIG. 7 mainly in that an information providing apparatus 1000 as a server includes a function of controlling the size of the image information created by an image information creating unit 1013.

The information providing apparatus 1000 further includes an information size control unit 1018 and an information creating unit 1019 as well as a map information storage unit 1010 storing the map information 1006, and a communication parameter obtaining unit 1011, and a position information associating unit 1012, and an image information creating unit 1013, a communication unit 1015.

On the other hand, the wireless communication terminal device 1020 is provided with a receiving unit 1021 and a display unit 1030. The wireless communication terminal device 1020 is a communication terminal such as a mobile phone, a smart phone, or the like owned by a user. The display unit 1030 includes a plurality of display regions including a first display region 1030-1 and a second display region 1030-2 in the same manner as in FIG. 9.

The map information 1006 stored in the map information storage unit 1010 includes position information, address information, building name information, shop name information, for example. Among them, the building name information includes names recorded on a general map such as names of rail stations, bus stops of route buses, historic sites, scenic locations, parks, rivers and streams, harbors, and the like, for example (as described above). The position information described herein corresponds to the current position of a location for which map display is requested (a user as an information providing target (or a wireless communication device owned by the user), for example).

The communication parameter obtaining unit 1011 obtains communication parameters associated with the position information. The communication parameters described herein is information relating to levels of congestion of a plurality of public wireless base stations and communication rate calculated based on the levels of congestion (as described above). The communication parameters may be a communication parameter obtained by equalizing the communication parameters collected from a plurality of wireless communication devices in units of information relating to time and information relating the positions. However, the communication parameters are not limited to fixed values but may include parameters which dynamically vary in association with the time information.

The position information associating unit 1012 associates the map information 1006 stored in the map information storage unit 1010 and the communication parameters obtained by the communication parameter obtaining unit 1011 with the position information (as described above). In addition, the image information creating unit 1013 creates the image information in which the communication parameters associated with the position information are described on the map information.

The information size control unit 1018 controls the size of the information to be transmitted to the wireless communication terminal device 1020 based on the information relating to positions, which is created by the position information associating unit 1012 and the information of the communication parameter.

For example, when additional information such as an advertisement or the like is transmitted to the wireless communication terminal device 1020 at a certain spot, the information providing apparatus 1000 reads a communication parameter associated with the position at which the wireless communication terminal device 1020 is present. When the communication parameter indicates the congestion of traffic at the position where the wireless communication terminal device 1020 is present, that is, the low communication rate, the information size control unit 1018 outputs a signal for reducing the information size to the information creating unit 1019. Then, the information creating unit 1019 creates additional information such as an advertisement or the like with a small size based on the signal from the information size control unit 1018. On the other hand, the communication parameter indicates no-traffic congestion at the position where the wireless communication terminal device 1020 is present, that is, the high communication rate, the information size control unit 1018 outputs a signal for increasing the information size. Then, the information creating unit 1019 creates additional information such as an advertisement or the like with a large size based on the signal form the information size control unit 1018. In addition, the information size control unit 1018 may control the size of the image information created by the image information creating unit 1013.

The additional information created by the information creating unit 1019 is transmitted to the wireless communication terminal device 1020 via the communication unit 1015. On the side of the wireless communication terminal device 1020, the map information in which the communication parameters are described is displayed on the first display region 1030-1 while the additional information is displayed on the second display region 1030-2 among the display regions of the display unit 1030.

Here, the additional information created by the information creating unit 1019 includes not only an advertisement but also general information such as weather forecasting, news, music content, image content, video content, and the like. In addition, the control of the information size may include change of compression ratios or change of compression schemes.

As described above, since the information providing apparatus 1000 can adjust the size of the additional information in accordance with the traffic conditions at the spot where the wireless communication terminal device 1020 is present when the additional information such as an advertisement or the like is delivered as well as the information relating to the traffic, it is possible to deliver the additional information while minimizing the load on the traffic.

It should be understood by those skilled in the art that various modifications, combinations, sub-combinations and alterations may occur depending on design requirements and other factors insofar as they are within the scope of the appended claims or the equivalents thereof.

What is claimed is:

1. A communication terminal device, including:
a communication parameter detection unit configured to detect a plurality of communication parameters of at least one base station, wherein the detected plurality of communication parameters are associated with at least one of information associated with a position of the communication terminal device or information associated with time of detection;
a display unit configured to display numerical values of the plurality of communication parameters, wherein the numerical values indicate levels of congestion or communication rate of the at least one base station, wherein the numerical values of the plurality of communication parameters are displayed in a graph form or in a digital format or with icons; and
a transmitting unit configured to transmit the detected plurality of communication parameters.

2. The communication terminal device according to claim 1, further including a communication business operator selecting unit configured to select a preferred communication business operator among a plurality of communication business operators or a preferred wireless scheme among a plurality of wireless schemes.

3. The communication terminal device according to claim 2, wherein the communication business operator selecting unit is further configured to select the preferred communication business operator among the plurality of communication business operators or the preferred wireless scheme among the plurality of wireless schemes based on a character or a first icon, wherein the character or the first icon indicates the preferred communication business operator or the preferred wireless scheme.

4. The communication terminal device according to claim 2, further including a wireless scheme setting unit configured to receive output from the communication business operator selecting unit.

5. The communication terminal device according to claim 4, further comprising
a wireless communication unit configured to execute a telephone call or packet communication with an apparatus other than the communication terminal device via a carrier frequency,
wherein the wireless scheme setting unit is further configured to set the wireless communication unit to a wireless scheme based on a graphic corresponding to the preferred communication business operator of the plurality of communication business operators.

6. The communication terminal device according to claim 5, wherein a visual effect, different from that for a plurality of graphics corresponding to communication business operators other than the preferred communication business operator of the plurality of communication business operators or a plurality of graphics corresponding to wireless schemes other than the preferred wireless scheme of the plurality of wireless schemes, is applied on the graphic corresponding to the preferred communication business operator.

7. The communication terminal device according to claim 6, wherein the visual effect is realized by one of a change in a color of a character, a blink of the character, a change of a background color of the character or a blink of the background color of the character.

8. The communication terminal device according to claim 1, wherein the display unit is further configured to include a plurality of display regions, wherein the plurality of display regions include a first display region and a second display region.

9. The communication terminal device according to claim 8, wherein image information of the plurality of communication parameters is displayed on the first display region, and wherein additional information is displayed on the second display region of the plurality of display regions of the display unit.

10. The communication terminal device according to claim 1, wherein the transmitting unit is further configured to transmit the information associated with the position of the communication terminal device, the information associated with the time of detection, and the detected plurality of communication parameters to an information providing apparatus.

11. An information providing method, comprising:
in a communication terminal device:
    detecting a plurality of communication parameters of at least one base station, wherein the detected plurality of communication parameters are associated with at least one of information associated with a position of the communication terminal device or information associated with time of detection;
    displaying numerical values of the plurality of communication parameters, wherein the numerical values indicate levels of congestion or communication rate of the at least one base station, wherein the numerical values of the plurality of communication parameters are displayed in a graph form or in a digital format or with icons; and
    transmitting the communication parameters to a device other than the communication terminal device.

12. The information providing method according to claim 11, further comprising selecting a preferred communication business operator among a plurality of communication business operators or a preferred wireless scheme among a plurality of wireless schemes based on the detected plurality of communication parameters.

13. The information providing method according to claim 12, wherein the preferred communication business operator among the plurality of communication business operators or the preferred wireless scheme among the plurality of wireless schemes is selected based on a character or a first icon, wherein the character or the first icon indicates the preferred communication business operator or the preferred wireless scheme.

14. The information providing method according to claim 12, further comprising setting a wireless communication unit to a wireless scheme based on a graphic corresponding to the preferred communication business operator of the plurality of communication business operators, wherein the wireless communication unit is configured to execute a telephone call or packet communication with an apparatus other than the communication terminal device via a carrier frequency.

15. The information providing method according to claim 14, further comprising applying a visual effect different from that for a plurality of graphics corresponding to communication business operators other than the preferred communication business operator of the plurality of communication business operators or a plurality of graphics corresponding to wireless schemes other than the preferred wireless scheme of the plurality of wireless schemes on the graphic corresponding to the preferred communication business operator.

16. The information providing method according to claim 15, wherein the visual effect is realized by one of changing a color of a character, causing the character to blink, changing a background color of the character, or causing the background color of the character to blink.

17. The information providing method according to claim 11, further comprising:
    displaying image information of the plurality of communication parameters on a first display region of a plurality of display regions of a display unit; and
    displaying additional information on a second display region of the plurality of display regions of the display unit.

18. The information providing method according to claim 11, further comprising transmitting the information associated with the position of the communication terminal device and the information associated with the time of detection, and the detected plurality of communication parameters to an information providing apparatus.

19. A communication device, including:
circuitry configured to:
    detect a plurality of communication parameters of at least one base station, wherein the detected plurality of communication parameters are associated with at least one of information associated with a position of the communication device or information associated with time of detection;
    control to display numerical values of the plurality of communication parameters, wherein the numerical values indicate levels of congestion or communication rate of the at least one base station, wherein the numerical values of the plurality of communication parameters are displayed in a graph form or in a digital format or with icons; and
    transmit the detected plurality of communication parameters.

* * * * *